United States Patent [19]

Hwang et al.

[11] Patent Number: 5,801,932
[45] Date of Patent: Sep. 1, 1998

[54] INTERLEAVED CURRENT-FED FORWARD CONVERTER

[75] Inventors: Jiunn-Bin Hwang; Te-Ping Tsai, both of Taoyuan Hsien, Taiwan

[73] Assignee: Chun-Shan Institute of Science and Technology, Taoyuan Hsien, Taiwan

[21] Appl. No.: 859,164

[22] Filed: May 20, 1997

[51] Int. Cl.[6] .................................................. H02M 3/335
[52] U.S. Cl. ............................... 363/21; 363/16; 363/97
[58] Field of Search .............................. 363/16, 17, 20, 363/21, 95, 97, 98, 131, 132

[56] References Cited

U.S. PATENT DOCUMENTS

| | | | |
|---|---|---|---|
| 4,618,919 | 10/1986 | Martin, Jr. | 363/21 |
| 5,008,795 | 4/1991 | Parsley et al. | 363/20 |
| 5,057,986 | 10/1991 | Henze et al. | 363/20 |
| 5,402,329 | 3/1995 | Wittenbreder, Jr. | 363/16 |
| 5,471,376 | 11/1995 | Tsai et al. | 363/20 |
| 5,477,132 | 12/1995 | Canter et al. | 323/282 |
| 5,508,903 | 4/1996 | Alexndrov | 363/16 |

*Primary Examiner*—Adolf Berhane
*Attorney, Agent, or Firm*—William E. Pelton

[57] ABSTRACT

An interleaved current-fed forward converter apparatus includes two transformers each including two primary windings and a secondary winding connected to a load, two power switches each of which is connected between the primary windings of a corresponding one of the two transformers. The two power switches are alternately turned on and off in response to two pulse signals provided by a conventional controller. Two capacitors each are connected between the primary windings of respective one of the two transformers. One of the two transformers functions to transfer power to the load while the other functions as an inductor so as to alleviate the necessity of a conventional output inductor, and vice versa alternately. The two capacitors are alternately charged/discharged in response to the switching operation of the two power switches.

7 Claims, 6 Drawing Sheets

TO→T1

T1→T2

$T2 \rightarrow T3$ $T3 \rightarrow T0$

INTERLEAVED CURRENT-FED FORWARD CONVERTER

BACKGROUND OF THE INVENTION

The present invention relates to a switching power supply, and particularly to an interleaved current-fed forward converter for a switching power supply.

Switching mode power supplies are often used in small-size electrical appliances such as personal computers. A plurality of low voltage stress forward configurations of switching mode power supplies have been developed. However, such configurations still require a large input filter to reduce the noise caused by a pulsating input current of a forward converter.

A typical topology of a forward converter is illustrated in FIG. 1A, where a power transformer is constituted by two identical primary windings T11, T12, and a secondary winding T13, with a turn ratio of 1:1:N, and "N" is a positive integer. An output circuit constituted by two diodes D1, D2, an output inductor L, and a filtering capacitor C are connected between the secondary winding T13 and a load R. A diode D and a power transistor Q are respectively connected to the primary windings T12 and T11, so that the power transistor Q may turn on and off alternately in response to an external oscillation signal (not shown) coupled to the gate thereof. The conventional topology is very simple and commonly used. However, there are drawbacks such as overshoot phenomena existing in the power transistor Q during transition from "on" state to "off" state, and a negative current component in the input current $I_{in}$. FIG. 1B illustrates the waveforms of the drain-source voltage $V_D$ across the transistor Q, the drain current $I_D$, and the input current $I_{in}$. The power transistor is required to have a relatively high rating voltage due to the above drawbacks. Furthermore, harmonics of very high frequency pulsating currents will be induced which prevent the conventional topology from being used in those systems requiring very low noise.

U.S. Pat. No. 5,523,936 issued to one of the inventors of the present invention, Hwang, discloses a built-in input filter forward converter for alleviating the surge current and the harmonics of high frequency of noises occurring in the conventional forward converter. Referring to FIG. 2A (disclosed in the U.S. Pat. No. 5,523,936 in more detail), a power switch Q, a clamping diode $D_c$, and two cross-coupled capacitors C1, C2 are connected to a split-winding transformer Tr. The capacitors C1 and C2 together with an input inductor Lin form an LC filter. With this structure, the harmonics of high frequency noise are alleviated, and the input current $I_{in}$ has a relatively smooth form as shown in FIG. 2B. Additionally, this structure can absorb leakage inductance and promote operation efficiency.

However, there are drawbacks existing in this built-in input filter forward converter. The four primary windings each require relatively many turns which cause difficulties in manufacturing. The output inductor L needs relatively large copper wires which occupy much space. The output current of this structure is limited to low power consumption, for example, below 300 watts, therefore this structure is not suitable for the requirement of a relatively high power system.

SUMMARY OF THE INVENTION

An object of the present invention is to provide an interleaved current-fed forward converter for a switching power supply, which requires fewer windings of a transformer than a conventional one, operates properly without the need of an output inductor, and can be used in high power systems.

Another object of the present invention is to provide a novel forward converter which is configured with two transformers, two power transistors, a full-wave rectifier and filter, and two coupled capacitors for constituting two sets of parallel related current-fed forward converters alternately operating to achieve a high output current with fewer windings.

Another object of the present invention is to provide a novel forward converter which is configured with two sets of parallel-related current-fed forward converters alternately operating so that one of them operates as an input inductor during the alternate operation for the purpose of replacing the output inductor, thus, requiring fewer components and saving space.

A further object of the present invention is to provide a novel forward converter with two cross-coupled capacitors for storing and recovering leakage energy thereby improving the converter's efficiency.

According to the present invention, there is provided an interleaved current-fed forward converter apparatus which comprises: a first transformer and a second transformer each comprising a first primary winding, a second primary winding and a secondary winding connected to a load; a first power switch being connected between the first primary windings of the first transformer and the second transformer, and a second power switch being connected between the second primary windings of the first transformer and the second transformer, the first power switch and the second power switch being alternately turned on and off in response to two pulse signals which are substantially complementary; and a first capacitor being connected between the first primary winding and the second primary winding of the first transformer, and a second capacitor being connected between the first primary winding and the second primary winding of the second transformer.

Other objects, advantages, and novel features of the invention will become more apparent from the following detailed description when taken in conjunction with the accompanying drawings.

DETAILED DESCRIPTION OF THE PREFERRED EMBODIMENTS

Figure 1A:
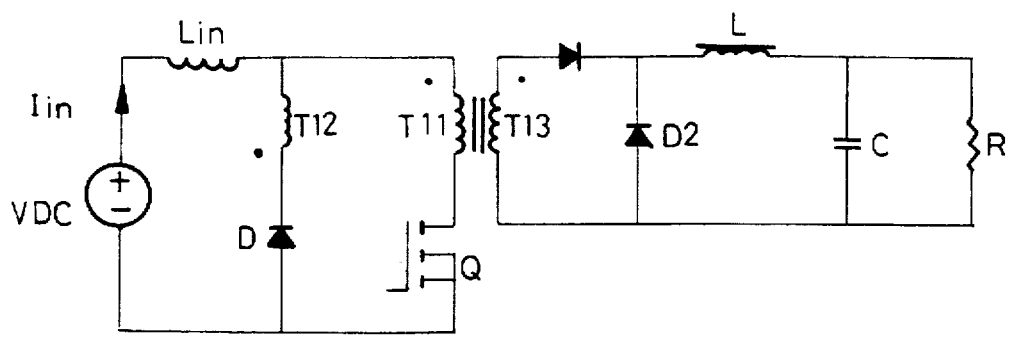
FIG. 1A is a schematic view of a conventional forward converter.
Figure 1B:
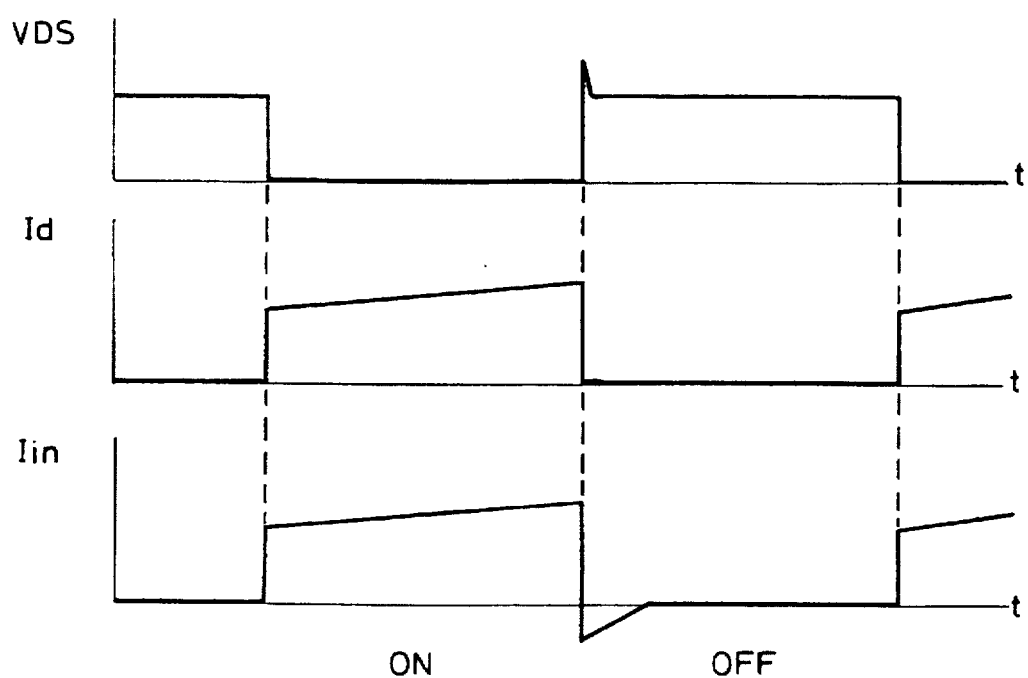
FIG. 1B illustrates several waveforms of the conventional forward converter of FIG. 1A.

Referring now to drawings wherein like reference characters designate identical or corresponding parts through the several views.

Figure 3:
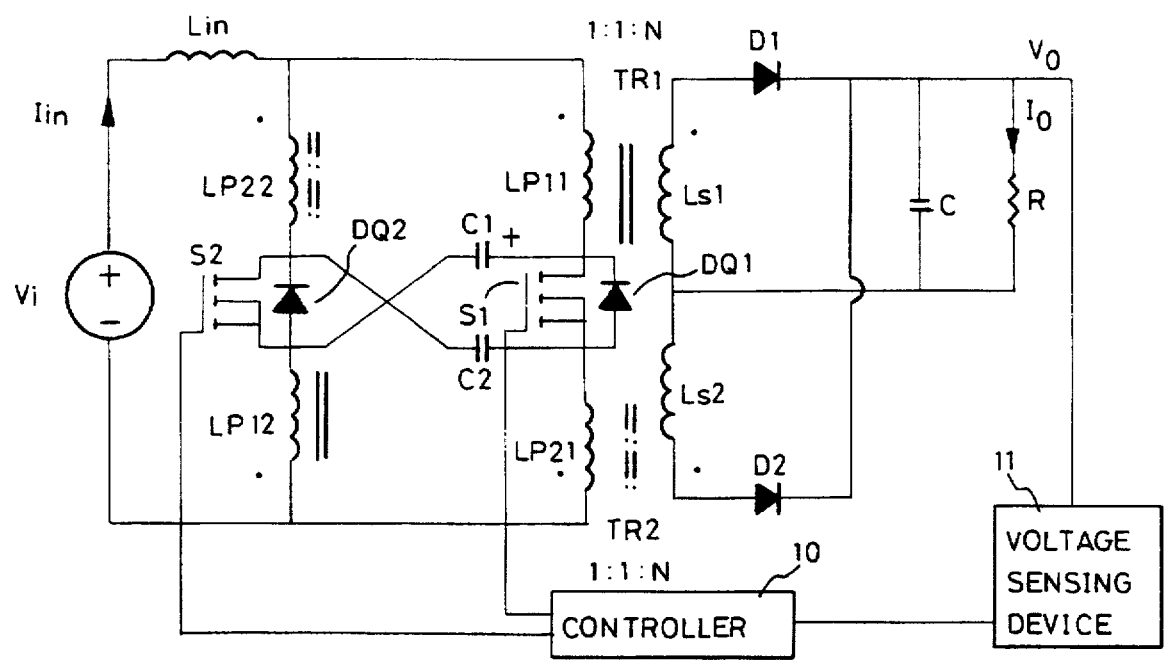
FIG. 3 illustrates a schematic diagram of the forward converter in accordance with the present invention.

Referring to FIG. 3, a circuit diagram of a forward converter of the present invention is shown. The converter includes a first transformer TR1, a second transformer TR2, a first power switch S1, a second power switch S2, a first clamping diode DQ1, a second clamping diode DQ2, a first capacitor C1, a second capacitor C2, and a conventional rectifier and filter circuit constituted by two diodes D1 and D2 and a capacitor C. Basically, the first transformer TR1 and the second transformer TR2 are identical components. The first transformer TR1 comprises a first primary winding LP11, a second primary winding LP12 and a secondary winding LS1. The second transformer TR2 comprises a first primary winding LP21, a second primary winding LP22 and a secondary winding LS2. The first power switch S1 is serially connected between the first primary windings LP11 and LP21 of the two transformers. The second power switch S2 is serially connected between the second primary windings LP12 and LP22 of the two transformers. The power switches S1 and S2 may be power transistors, for example, MOSFETs, or other switching components. The first and the second clamping diodes DQ1 and DQ2 are respectively connected with the first and the second power switch S1 and S2 in parallel. The first capacitor C1 is serially connected between the first primary winding LP11 and the second primary winding LP12 of the first transformer TR1. Similarly, the second capacitor C2 is serially connected between the first primary winding LP21 and the second primary winding LP22 of the second transformer TR2.

An input inductor $L_{in}$ representing the resultant leakage inductance from the transformers and any stray inductances in the circuit is coupled between the power source $V_{in}$ and the primary windings of the transformers. The secondary windings LS1 and LS2 of the transformers are connected to the full-wave rectifier and filter circuit in a very conventional manner. An output voltage $V_o$ obtained at the load R is coupled to a controller 10 via a voltage sensing device 11. The controller 10 sends two alternately pulsed signals respectively to the gates of the first power transistor S1 and the second power transistor S2 for alternately turning on/off the two power transistors. The voltage detecting device 11 and the controller 10 are well known, therefore the detailed structures thereof are omitted herein.

Figure 2A:
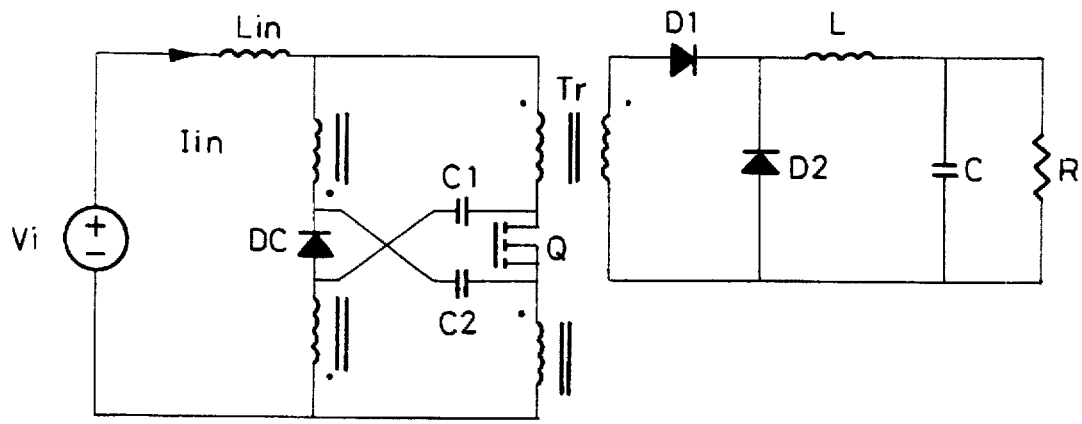
FIG. 2A is a schematic view of another conventional forward converter.
Figure 2B:
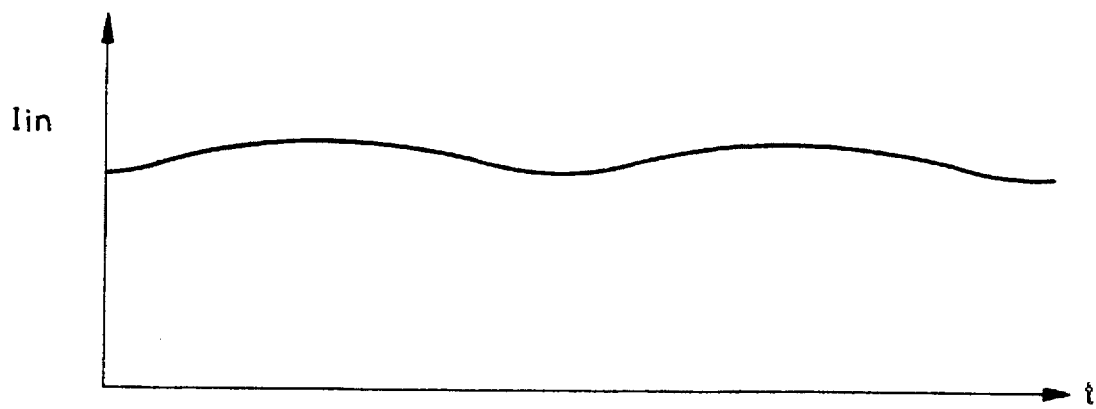
FIG. 2B illustrates a waveform of an input current of the forward converter of FIG. 2A.

The forward converter apparatus as shown in FIG. 3 may be treated as two parallel-connected current-fed forward converters. The first transformer TR1 and the second transformer TR2 are respectively actuated by the first power transistor S1 and the second power transistor S2. Therefore, when the first transformer TR1 outputs a voltage to the rectifier and filter circuit, the second transformer TR2 is treated as an input inductor to alleviate the necessity of an output inductor, and vice versa. Since the structure of the transformers TR1 and TR2 are quite simple, the manufacture thereof is easy compared to the transformer which has four primary windings in the built-in input filter forward converter as shown in FIG. 2A. Moreover, the capacitors C1 and C2 can perform a filtering effect on the input current $I_{in}$, thus alleviating the problem of high frequency harmonics.

Figure 4:
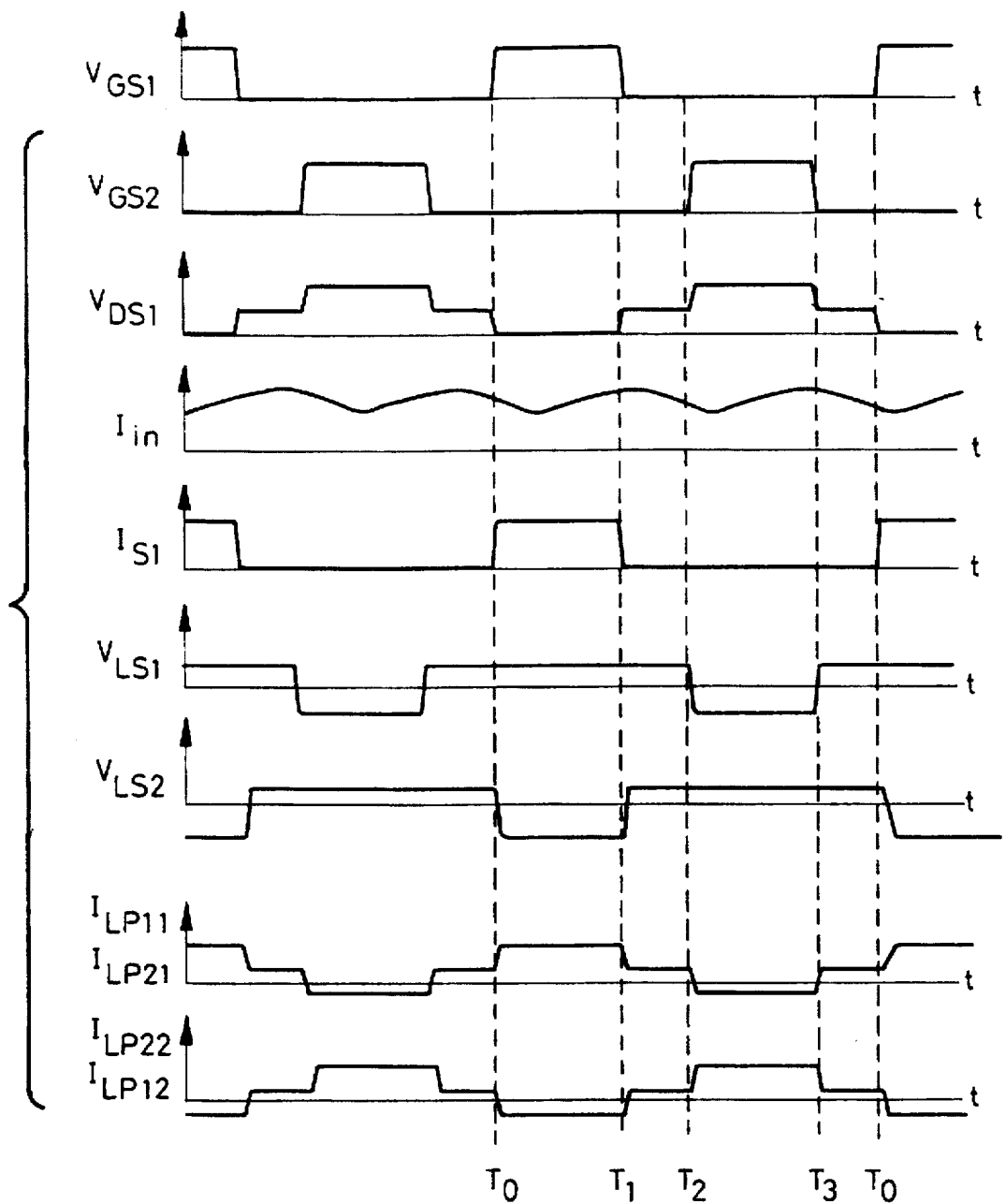
FIG. 4 illustrates several waveforms of the circuit diagram of the forward converter of FIG. 3.

FIG. 4 illustrates several waveforms of the circuit diagram of FIG. 3, where the forward converter of the present invention periodically operates in four time stages which are time intervals T0-T1, T1-T2, T2-T3, and T3-T0, and then repeated. Voltages between a gate and a source of the MOSFETs S1, S2 are respectively referred to as $V_{GS1}$ and $V_{GS2}$. A voltage between the drain and the source of the MOSFET is referred to as $V_{DS}$. A current flowing through the first power transistor S1 is referred to as $I_{S1}$. Voltages across the secondary windings LS1 and LS2 are respectively referred to as $V_{LS1}$ and $V_{LS2}$. Currents flowing through primary windings LP11, LP21, LP12, and LP22 are respectively expressed by $I_{LP11}$, $I_{LP21}$, $I_{LP12}$, and $I_{LP22}$.

Four equivalent circuit diagrams are shown in FIGS. 5, 6, 7, and 8 each of which respectively corresponds to one of the four operation intervals of the forward converter of FIG. 3.

Figure 5:
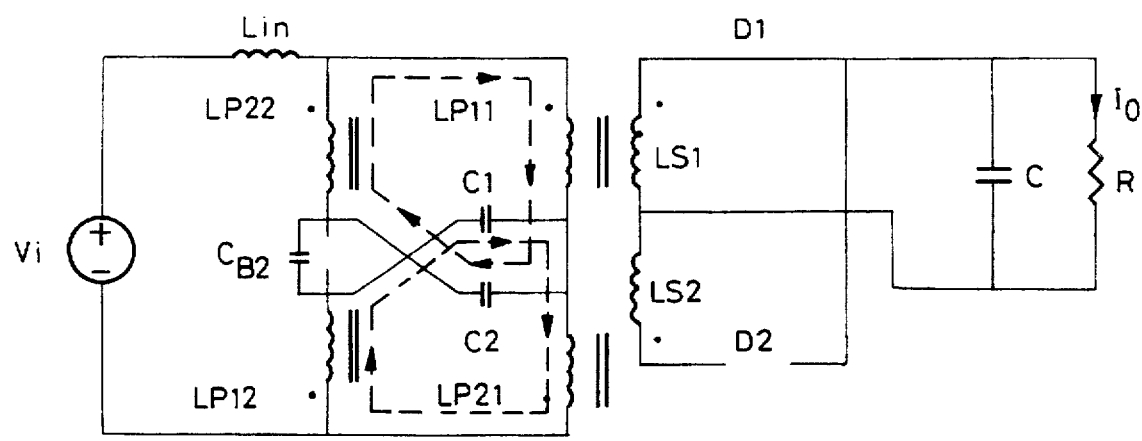
FIG. 5 is an equivalent circuit of the forward converter of the present invention operating during a first time interval.

During time interval T0-T1 as shown in FIG. 5, the power switch S1 is turned on by actuation of a pulse signal $V_{GS1}$ from the controller 10, and a current loop of LP11-S1-LP21 is formed to transfer power to the load R via a path of LS1-D1. During the time interval, the power switch S2 and the diode D2 are turned off. Additionally, two current loops C1-LP21-LP12 and C2-LP22-LP11 are formed to further transfer energy from capacitors C1, C2 to the load R. The clamping diode DQ2 is equivalent to a parasitic capacitor $C_{B2}$ when the second power switch S2 is turned off. A voltage $V_{DC}$ across the clamping diode DQ2 (i.e., the voltage across the second power switch S2) increases to 2Vi and remains constant during this time interval T0-T1.

Figure 6:
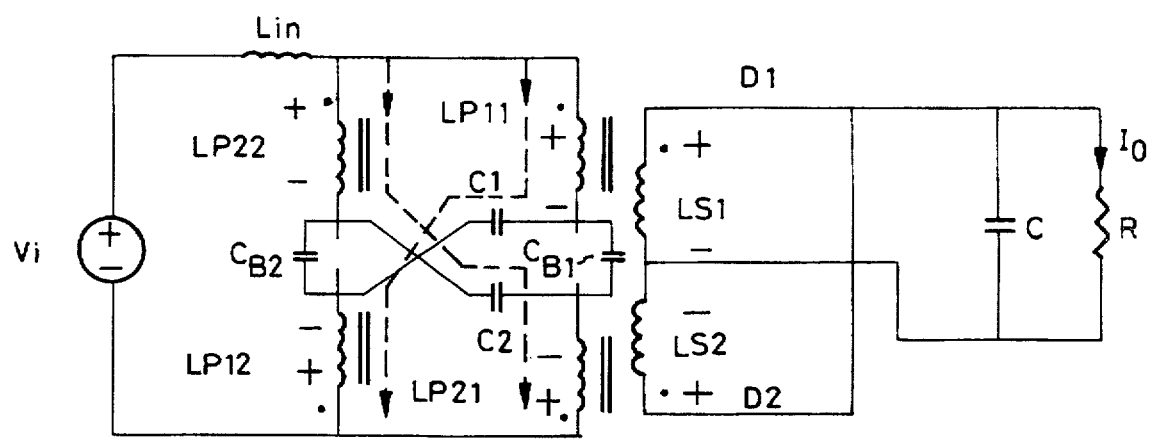
FIG. 6 is an equivalent circuit of the forward converter of the present invention operating during a second time interval.

During time interval T1-T2 as shown in FIG. 6, the first power switch S1 is turned off at time T1, and the two rectifying diodes D1 and D2 each respectively conduct an identical current Io/2 therethrough. The two capacitors C1 and C2 are charged by an output current Io/2N reflected from the output capacitor C respectively via a path LP11-C1-LP12, and a path LP22-C2-LP21 until the voltages across each of the two power transistors S1 and S2 increase to Vi and maintain the same. In this time interval, the potential reflected from the output circuit is absorbed by the two capacitors C1 and C2. The two capacitors C1 and C2 filter out the input surge current and also alleviate impulses resulting from transition of the power transistors S1 and S2, thus achieving a filtering effect.

Figure 7:
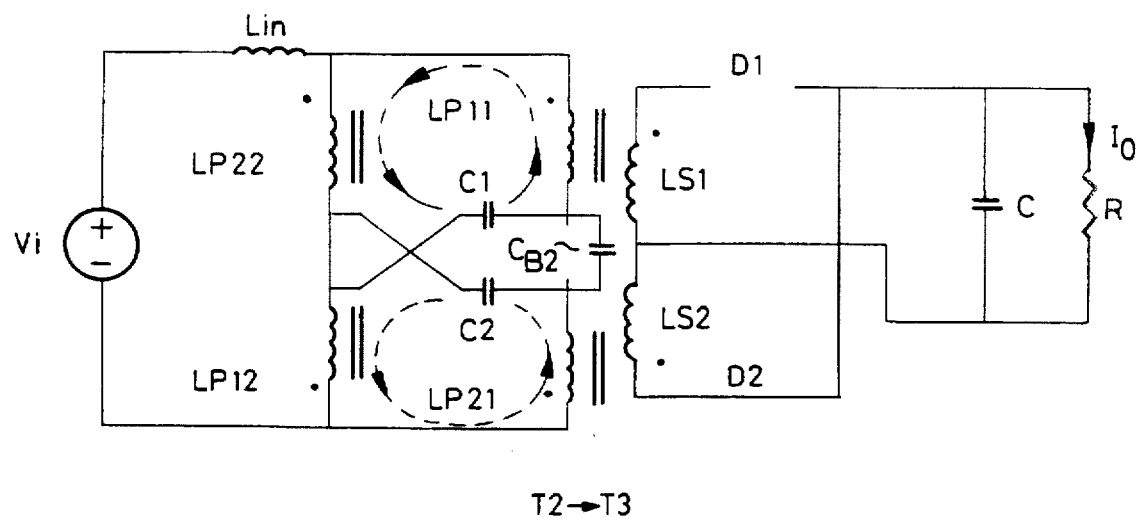
FIG. 7 is an equivalent circuit of the forward converter of the present invention operating during a third time interval.

During the time interval T2-T3 as shown in FIG. 7, the second power switch S2 is turned on by actuation of a pulse signal VGS2 from the controller 10, and a current loop of LP22-S2-LP12 is formed to transfer power to the load R via a path of LS2-D2. The first power switch S1 and the first diode D1 are turned off. Additionally, two current loops C1-LP11-LP22 and C2-LP12-LP21 are formed to further transfer energy from capacitors C1, C2 to the load R. The first clamping diode DQ1 is equivalent to a parasitic capacitor $C_{B1}$ when the first power switch S1 is turned off. A voltage $V_{DC}$ across the clamping diode DQ1 (i.e., the voltage across the first power switch S1) increases to 2Vi and remains constant during this time interval T2-T3.

Figure 8:
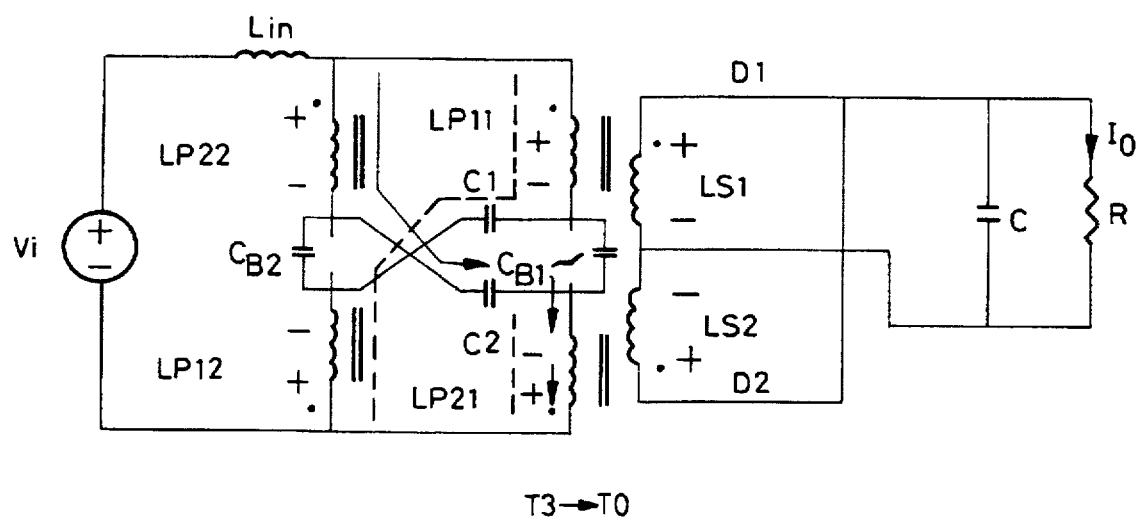
FIG. 8 is an equivalent circuit of the forward converter of the present invention operating during a fourth time interval.

During time interval T3-T0 as shown in FIG. 8, the second power switch S2 is turned off at time T3, and the two rectifying diodes D1 and D2 each respectively conduct an identical current Io/2 therethrough. The two capacitors C1 and C2 are charged by an output current Io/2N reflected from the output capacitor C respectively via a path LP11-C1-LP12, and a path LP22-C2-LP21 until the voltages across each of the two power transistors S1 and S2 increase to Vi and maintain the same. During this time interval, the potential reflected from the output circuit is absorbed by the two capacitors C1 and C2. The two capacitors C1 and C2 filter out the input surge current and also alleviate impulses resulting from transition of the power transistors S1 and S2, thus achieving a filtering effect.

The operation of the interleaved current-fed forward converter as described can be concluded as following. The two power switches are alternately turned on and off in response to two pulse signals provided by a conventional controller. The two capacitors are alternately charged/discharged in response to the switching operation of the two power switches. One of the two transformers functions to transfer power to the load while the other functions as an inductor so as to alleviate the necessity of a conventional output inductor, and vice versa alternately.

Although the invention has been explained in relation to its preferred embodiment, it is to be understood that many other possible modifications and variations can be made without departing from the spirit and scope of the invention as hereinafter claimed. For example, each of the first transformer and the second transformer may be constituted by a plurality of transformers.

I claim:

1. An interleaved current-fed forward converter apparatus comprising:
    a first transformer and a second transformer each comprising a first primary winding, a second primary winding and a secondary winding connected to a load;
    a first power switch being connected between the first primary windings of the first transformer and the second transformer, and a second power switch being connected between the second primary windings of the first transformer and the second transformer, the first power switch and the second power switch being alternately turned on and off in response to two pulse signals which are substantially complementary; and
    a first capacitor being connected between the first primary winding and the second primary winding of the first transformer, and a second capacitor being connected between the first primary winding and the second primary winding of the second transformer.

2. An interleaved current-fed forward converter apparatus as claimed in claim 1, wherein the first transformer and the second transformer are identical.

3. An interleaved current-fed forward converter apparatus as claimed in claim 1, wherein the first transformer and the second transformer alternately and respectively transfer power to the load and function as pure inductors.

4. An interleaved current-fed forward converter apparatus as claimed in claim 1, wherein a first clamping diode is connected to the first power switch in parallel and a second clamping diode is connected to the second power switch in parallel.

5. An interleaved current-fed forward converter apparatus as claimed in claim 1, wherein the first power switch and the second power switch are transistors.

6. An interleaved current-fed forward converter apparatus as claimed in claim 1, wherein the first power switch and the second power switch are N-type MOSFETs.

7. An interleaved current-fed forward converter apparatus as claimed in claim 1, wherein each of the first transformer and the second transformer is constituted by a plurality of transformers.

* * * * *